United States Patent
Park et al.

(10) Patent No.: US 9,486,801 B2
(45) Date of Patent: Nov. 8, 2016

(54) CONTROL VALVE FOR A WATER TREATMENT SYSTEM

(75) Inventors: Stuart L. Park, Chardon, OH (US); Jerome Kovach, Chagrin Falls, OH (US)

(73) Assignee: Kinetico Incorporated, Newbury, OH (US)

( * ) Notice: Subject to any disclaimer, the term of this patent is extended or adjusted under 35 U.S.C. 154(b) by 0 days.

(21) Appl. No.: 13/990,609

(22) PCT Filed: Dec. 2, 2011

(86) PCT No.: PCT/US2011/063085
§ 371 (c)(1),
(2), (4) Date: May 30, 2013

(87) PCT Pub. No.: WO2012/075406
PCT Pub. Date: Jun. 7, 2012

(65) Prior Publication Data
US 2013/0248457 A1    Sep. 26, 2013

Related U.S. Application Data

(60) Provisional application No. 61/419,339, filed on Dec. 3, 2010.

(51) Int. Cl.
*B01J 47/14* (2006.01)
*C02F 1/00* (2006.01)
(Continued)

(52) U.S. Cl.
CPC ............ *B01J 47/14* (2013.01); *C02F 1/006* (2013.01); *C02F 1/42* (2013.01); *G05D 7/018* (2013.01);
(Continued)

(58) Field of Classification Search
CPC ......... G05G 21/00; C02F 1/42; C02F 1/006; C02F 2201/005; C02F 2303/16; C02F 2209/001; C02F 2209/445; G05D 7/018; B01J 47/14; B01J 49/0091; B01J 49/0095; Y10T 137/86414; Y10T 137/86445; Y10T 137/86437
See application file for complete search history.

(56) References Cited

U.S. PATENT DOCUMENTS

| 4,298,025 A | 11/1981 | Prior et al. |
| 4,427,549 A | 1/1984 | Brown et al. |

(Continued)

FOREIGN PATENT DOCUMENTS

WO    2009133251    5/2009

OTHER PUBLICATIONS

PCT/US11/63085 International Search Report with Written Opinion completed Mar. 24, 2012.
(Continued)

*Primary Examiner* — Matthew O Savage
(74) *Attorney, Agent, or Firm* — Tarolli, Sundheim, Covell & Tummino LLP

(57) ABSTRACT

A control valve assembly including a water meter usage assembly including discs which are relatively positionable to adjust the frequency at which regeneration in a water treatment system starts. A regeneration control disc mounted coaxially with the meter disc assembly includes structure for releasing a drive mechanism associated with the meter disc assembly to rotate it back to a start position under a predetermined operating condition. The discs are releasably held in their relative positions by at least one pawl and at least one of the discs is rotatable relative to the other disc. The regeneration frequency is determined by an initiation slot in one of the discs and its operative position is determined by disc positions. The regeneration control disc is rotated by a pawl mechanism that is activated when an associated cam follower is received by the regeneration initiation slot formed in the water meter usage assembly.

12 Claims, 8 Drawing Sheets

(51) Int. Cl.
*G05D 7/01* (2006.01)
*C02F 1/42* (2006.01)
*B01J 49/00* (2006.01)

(52) U.S. Cl.
CPC ....... *B01J 49/0095* (2013.01); *C02F 2201/005* (2013.01); *C02F 2303/16* (2013.01); *Y10T 137/86413* (2015.04); *Y10T 137/86437* (2015.04); *Y10T 137/86445* (2015.04)

(56) References Cited

U.S. PATENT DOCUMENTS 6,287,457 B1    9/2001   Van De Moortele
2002/0121481 A1   9/2002   Peterson et al.

OTHER PUBLICATIONS

Supplementary European Search Report EP 11 84 4094; completed Sep. 1, 2015.

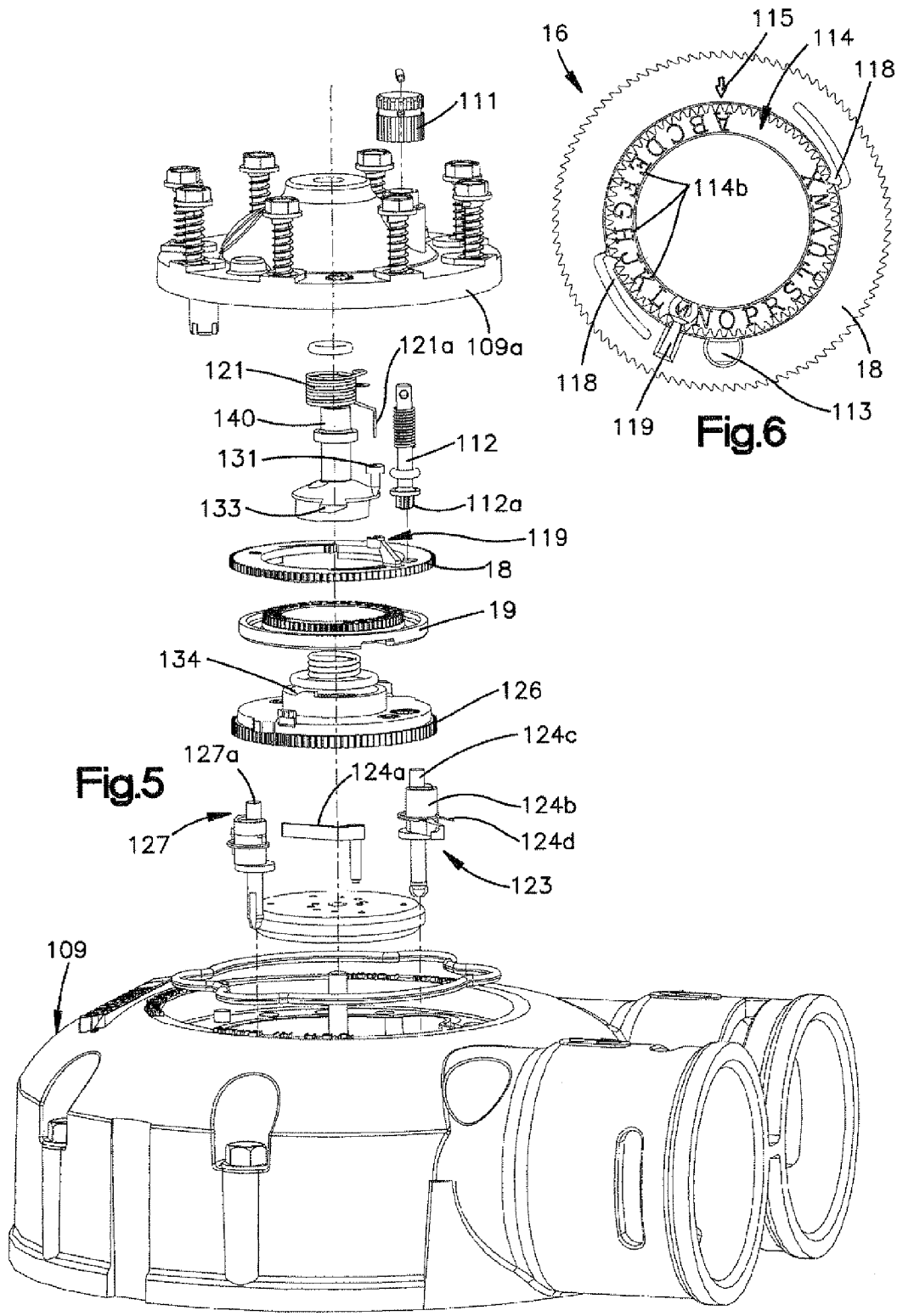

CONTROL VALVE FOR A WATER TREATMENT SYSTEM

CROSS REFERENCES TO RELATED APPLICATIONS

This application filed under 35 U.S.C §371 is a national phase application of International Application Serial Number PCT/US2011/063085 filed Dec. 2, 2011, which claims priority to U.S. Provisional Application 61/419,339, filed Dec. 3, 2010.

TECHNICAL FIELD

The present invention relates generally to a water treatment apparatus and methods and, in particular, to an improved control system and control device which includes an externally adjustable member for changing the frequency at which the water treatment system is regenerated.

BACKGROUND OF INVENTION

U.S. Pat. No. 4,298,025, which is owned by the present assignee, discloses a control valve for use in water softeners having two resin tanks. One of the resin tanks is normally on-line while the other tank is regenerated and placed in a standby condition until the first tank requires regeneration. The disclosed control valve controls which of the tanks is on-line and controls the regeneration sequence of an exhausted tank. The quantity of water treated by a given tank, is monitored by a mechanism that includes a water usage turbine driven by water as it leaves the on-line resin tank. When a predetermined quantity of water is treated, which produces a predetermined number of revolutions in the turbine, a regeneration sequence is initiated which places the standby tank on-line and isolates the exhausted tank. A second turbine, operatively connected to a regeneration sequence control element (in the form of a disk) is rotated by a stream of water that is activated at the beginning of the regeneration cycle. The stream of water physically drives the regeneration control disk (via the turbine and associated drive train) through its sequence. As described above, the frequency of regeneration of the water softener system is determined by the usage turbine which directly measures the quantity of fluid treated by a given tank and transmits that motion up to the use meter disc. The present design is limited to choosing a regeneration start from 1 to 8 times per revolution of the use meter disc located in the top cap region of the control valve.

In U.S. Pat. No. 4,427,549 which is also owned by the present assignee, a deionization method and apparatus is disclosed. The disclosed apparatus includes a control valve similar to the control valve disclosed in U.S. Pat. No. 4,298,025 in that it includes a usage turbine for monitoring the amount of source water treated by a given tank and a regeneration control turbine for driving a control element through a regeneration sequence.

The control valves disclosed in U.S. Pat. Nos. 4,298,025 and 4,427,549 are examples of Non-Electric, Meter Driven, Demand Initiated Regenerating (DIR) fluid treating control valves. These valves by virtue of the design features built into them have enabled them to possess operational benefits unlike similar products currently in the Market. These benefits include: an uninterrupted supply of treated water, counter-current regeneration, high efficiency by metered usage of the water, and regeneration with treated water to name a few.

In the control valve disclosed in U.S. Pat. No. 4,298,025 it should be noted that the motion of the usage turbine is transmitted through a gear train to a rotating eccentric shaft that drives a ratchet pawl, which in turn advances or rotates a circular meter disc. In the device shown in U.S. Pat. No. 4,298,025, the regeneration initiation starts from this circular meter disc. In the existing design, the regeneration start sequence begins when a regeneration start pawl is allowed to contact the lower regeneration control disc by having the cam follower on that regeneration start pawl drop into a cut out under the meter disc. The design allows there to be anywhere from 1 to 8 cutouts equally spaced around the meter disc. Therefore with each revolution of the meter disc a regeneration may be initiated from 1 time per revolution up to 8 times per revolution depending on which meter disc is installed in the device. The choice of this meter disc is made at installation and is based on the water hardness feeding the unit, or other inlet water chemistry measurements, that relate to the volume of that particular water the unit will be able to process effectively. While this allows for some adjustment to properly match the device to a particular inlet water chemistry, it can be seen that some efficiency can be lost when a particular chemistry falls just outside of the gallons offered by, for example a disc having only one slot (one regeneration per rotation) vs. a disc having two slots (two regenerations per rotation). Also the changing of the meter disc requires the unit to be depressurized and the top cap and several pawls to be removed, requiring some level of skill, some time and a potential for possible improper reassembly.

DISCLOSURE OF THE INVENTION

The present invention provides a new and improved control mechanism for controlling a valve applied to a fluid treatment system. The treatment system may function as a water softener, filter or other treatment device. The disclosed mechanism is adaptable to the control valves described in U.S. Pat. Nos. 4,298,025 and 4,427,549, which are hereby incorporated by reference. These valves control communication of water to be treated with a tank or tanks inlet(s) and controls the communication of treated water from a tank or tanks outlet(s) and a conduit or system outlet. A regeneration determining apparatus that includes a water driven turbine determines when the treatment media requires regeneration.

The present invention provides a control valve for controlling the regeneration of a water treatment system. According to the invention, the control valve includes a control valve housing that houses a water usage meter assembly that includes overlying first and second meter discs. In the illustrated embodiment, the first and second meter discs, and the regeneration control disc, have a common rotational axis. A regeneration control disc for controlling the sequence of regeneration steps is also provided. The first and second meter discs are relatively positionable with respect to each other in order to provide an incremental adjustment to a regeneration initiation cam slot.

The water usage meter assembly is advanced by a water flow responsive pawl mechanism until the regeneration initiation cam slot is aligned with a regeneration initiation cam follower, whereupon a regeneration pawl mechanism is activated in order to produce rotation in the regeneration control disc. According to the invention, the regeneration control disc includes at least one cam that operates to release the water usage meter assembly and allows the meter assembly to reverse rotate to a reset position, under predetermined operating conditions.

The predetermined operating conditions at which the meter assembly is allowed to reverse rotate may be the initiation of a regeneration cycle, the conclusion of the regeneration cycle or an intermediate step in the regeneration cycle.

In the preferred and illustrated embodiment, the control valve includes a first anti-rotation pawl for inhibiting reverse rotation of the water usage meter assembly when the first anti-rotation pawl is in a first position. The cam forming part of the regeneration control disc is operative to move the first anti-rotation pawl to a second position at which it disengages the water usage meter assembly.

According to the feature of the invention, a spring, preferably a torsion spring, is tensioned as the water usage meter assembly is advanced by its associated pawl mechanism. When the meter assembly is released, the tension spring applies a force to the meter assembly to reverse rotate it.

In the exemplary embodiment, the relative rotation between the first and second meter discs is resisted by another anti-rotation pawl that engages at least one of the meter discs. At least one of the meter discs also includes disc structure engageable by an external adjustment member which can be manipulated to overcome a force applied by the other anti-rotation pawl in order to rotate one meter disc relative to the other meter disc. Upon disengagement by the external adjustment member, the other anti-rotation pawl operates to maintain the relative positions of the meter discs. Preferably, the disc structure comprises gear teeth and the external adjustment member includes a stem having a portion extending outside of the control valve housing and a portion that includes a pinion engageable with the gear teeth.

In the illustrated embodiment, the water responsive pawl mechanism is operatively connected to a turbine that is driven by water flowing in the control valve housing.

An important feature of the invention is a means of allowing for a much finer adjustment of the meter disc regeneration start sequence, without having to disassemble or depressurize the unit.

In the prior art design, there were eight different use meter discs available, which had from one to eight cam slot openings. In the present invention this is now replaced with a single adjustable assembly, made up of an upper meter disc and a lower meter disc. These two parts of the assembly are rotatably adjustable relative to each other. The lower disc includes the cam slot opening as in the previous meter disc, however the cam slot opening is now made adjustable in its location around the circumference of the meter disc assembly by the relative adjustment between the top disc and the bottom disc.

In the present invention, the position of the cam slot opening can be adjusted and can start a regeneration in as few as 15 degrees to as many as 330 degrees of rotation, with the incremental adjustment of 4 degrees. This allows for a much finer adjustment capability than was previously available. In the meter disc mechanism disclosed in the above-identified patents, the meter disc was rotatable in one direction. The meter disc was incrementally rotated whenever treated water was being discharged by the water treatment system, by a pawl/ratchet mechanism fully described in the above-identified patents. The meter disc disclosed in this application, comprises an assembly of two relatively positionable discs having only one slot for receiving the regeneration initiation cam. More importantly, the meter disc assembly of the present invention advances in a first direction until a pawl enters the single slot whereupon regeneration is initiated. At either the beginning of regeneration or at the end of regeneration, a meter disc release mechanism, preferably forming part of the regeneration control disc, causes the release of the meter disc assembly from its pawl/ratchet mechanism and allows the meter disc assembly to reverse rotate under the influence of the torsion spring until it returns to its starting position. With the present invention, the meter disc assembly includes only one regeneration initiation slot and this slot is positionable along a wide range of positions on the periphery of the meter disc assembly. The position of the slot is determined by the relative rotated position of the upper meter disc with respect to the lower meter disc.

According to the invention, the adjustment between the top and bottom discs is performed externally by the downward motion of an actuator through the cap and by rotating the adjustment moving knob thereby rotating the lower disc in relationship to the upper disc, in either direction to achieve the desired adjustment. This movement changes the angular relationship between the cam slot opening and a stop incorporated into the top disc. It is this angular relationship that determines the frequency of regeneration per clockwise rotation of the use meter disc assembly. The setting of the adjustment is recorded and measured by the relationship of letters included on the lower disc and their relationship to an arrow included on the upper disc. The adjustment or relative positions of the meter discs are visible through a viewing window in the cap.

In the present invention, the use meter disc assembly is spring loaded to return to its reset or return position. The reset function is performed during a regeneration sequence by a set of cams that are located on the control disc. The function of these cams is to disengage the meter drive and anti-rotation pawls so that the use meter disc assembly is free to rotate under return spring force back to its reset or return position.

The manual, externally initiated regeneration start function included in the design disclosed in the above-identified patents is maintained in this present invention.

In accordance with the invention, a method for controlling the regeneration of a water treatment system is disclosed and includes the steps of providing a rotatable water usage meter assembly that rotates in response to water being processed by the water treatment system. A regeneration initiation slot is provided on the periphery of the water usage meter assembly. Its position is adjustable. A spring is provided that is tensioned by rotation of the water meter usage disc, the rotation being in response to water flow in the water treatment system. A regeneration control disc with an associated cam follower is provided. The method further includes a step of allowing the water usage meter disc assembly to rotate in response to water flowing in the water treatment system until the cam follower is received by the regeneration initiation slot. Upon receipt of the cam follower by the regeneration initiation slot, the regeneration control disc is incrementally rotated in order to move structure forming part of the regeneration control disc to a position at which the water usage meter assembly is placed in a released state. When in the released state, the spring is allowed to reverse rotate the water usage meter assembly to a start position. According to a feature of this method, the water usage meter assembly comprises two overlying discs and the position of the regeneration initiation slot is adjusted by rotating one disc relative to the other disc. The relative positions of the meter discs are changed by an externally manipulated adjustment member.

Additional features of the invention will become apparent and a fuller understanding obtained by reading the following detailed description made in conjunction with the accompanying drawings.

BRIEF DESCRIPTION OF DRAWINGS

The foregoing and other features and advantages of the present invention will become apparent to those skilled in the art to which the present invention relates upon reading the following description with reference to the accompanying drawings, in which:

FIG. 5 is an exploded view of a control valve assembly including the metering disc assembly and regeneration control disc of the present invention;

FIG. 6 is a top plan view of the metering disc assembly;

DESCRIPTION OF PREFERRED EMBODIMENTS

Figure 1:
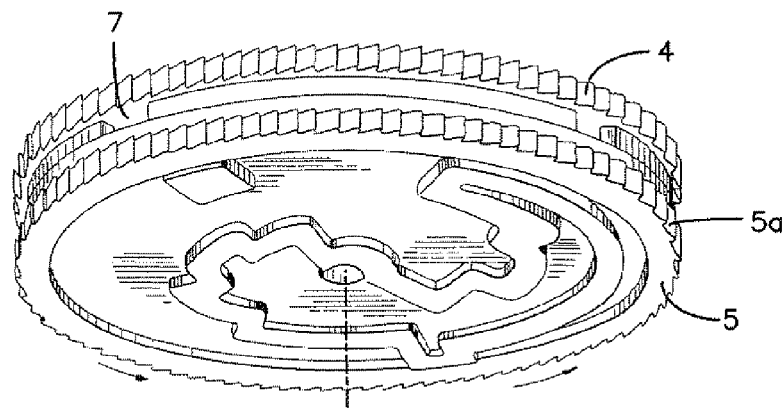
FIG. 1 illustrates a prior art design for a water usage monitoring and regeneration control device.
Figure 2:
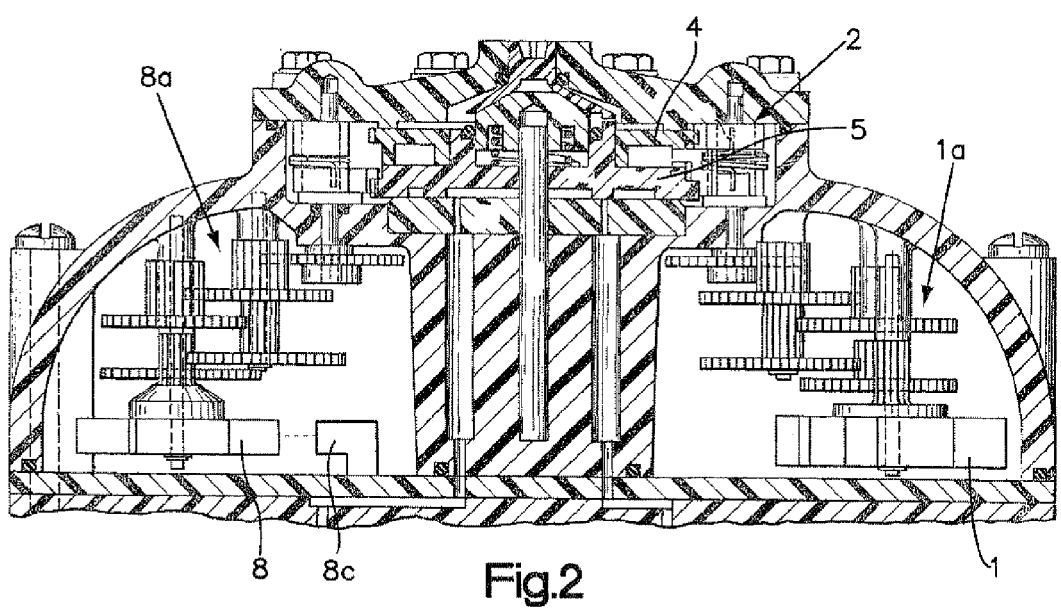
FIG. 2 is a sectional view of the prior art control valve that includes the water usage monitoring and regeneration control device shown in FIG. 1.

FIGS. 1 and 2 illustrate the construction of a prior art control valve. In this prior art valve and, referring in particular to FIG. 2, rotation of a water usage turbine 1 is reduced through a gear train 1a which, in turn, causes the rotation of an eccentric shaft 2. Potation of the eccentric shaft 2 reciprocally moves a meter drive pawl 3 to cause it to advance a water usage meter disc 4. In this prior art construction, the water usage disc 4 is moved one tooth per revolution of the eccentric shaft 2. This creates a clockwise rotation of the water usage disc 4 (as viewed from above). As a result, the water usage disc 4 is rotated in proportion to the volume of water metered. In the prior art construction, several configurations of the water usage disc 4 were available and the actual water meter disc used would determine the frequency of regeneration per revolution of the water usage meter disc 4. In the prior control valve, the regeneration sequence is started when a regeneration start pawl 6 (shown best in FIG. 1) is allowed to contact teeth 5a of a lower, regeneration control disc 5 when a cam follower 6a forming part of the start pawl 6 drops into a slot 7 formed in the water usage meter disc 4. As indicated above, several configurations of the meter disc were available. A disc with only one slot would start regeneration at approximately every 360° of revolution, whereas a disc with two slots would start regeneration at every 180° of disc rotation and so on. It should be noted here that the regeneration control disc 5 is driven by an eccentric shaft/pawl mechanism 9 that is operatively coupled to an associated turbine 8 and turbine gear train 8a. During regeneration a stream of water from a nozzle 8c (shown schematically) is directed at the regeneration control turbine 8 to produce the necessary rotation.

Figure 3:
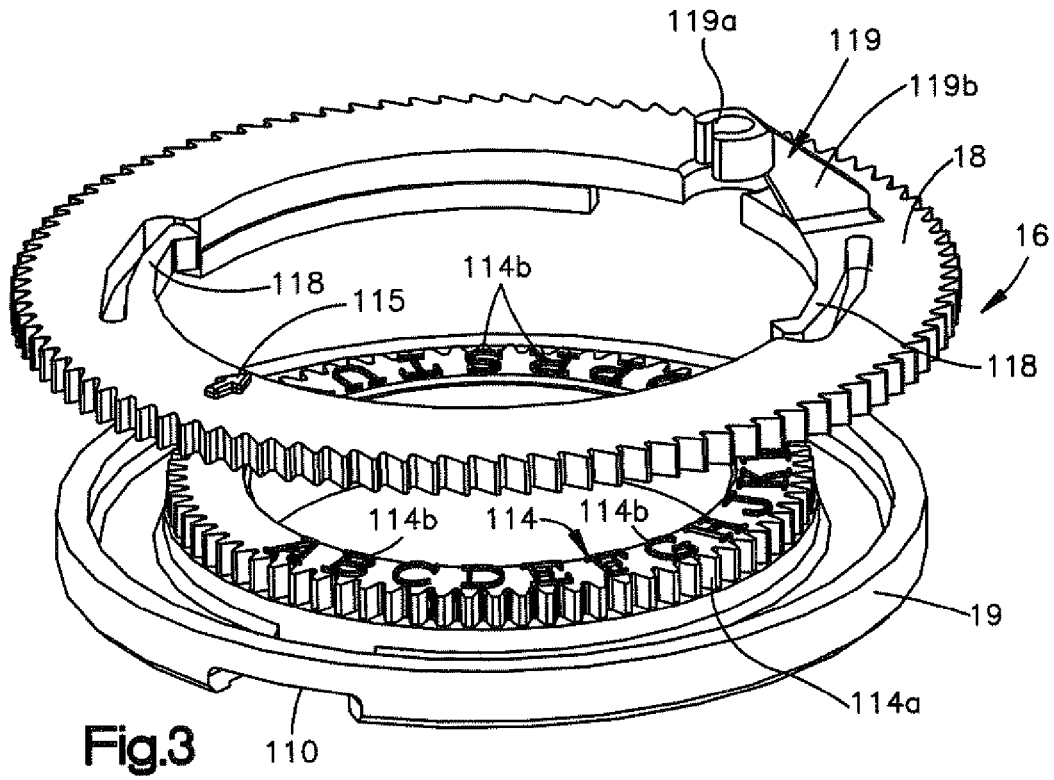
FIG. 3 is a perspective view of a metering disc assembly constructed in accordance with a preferred embodiment of the invention.
Figure 4A:
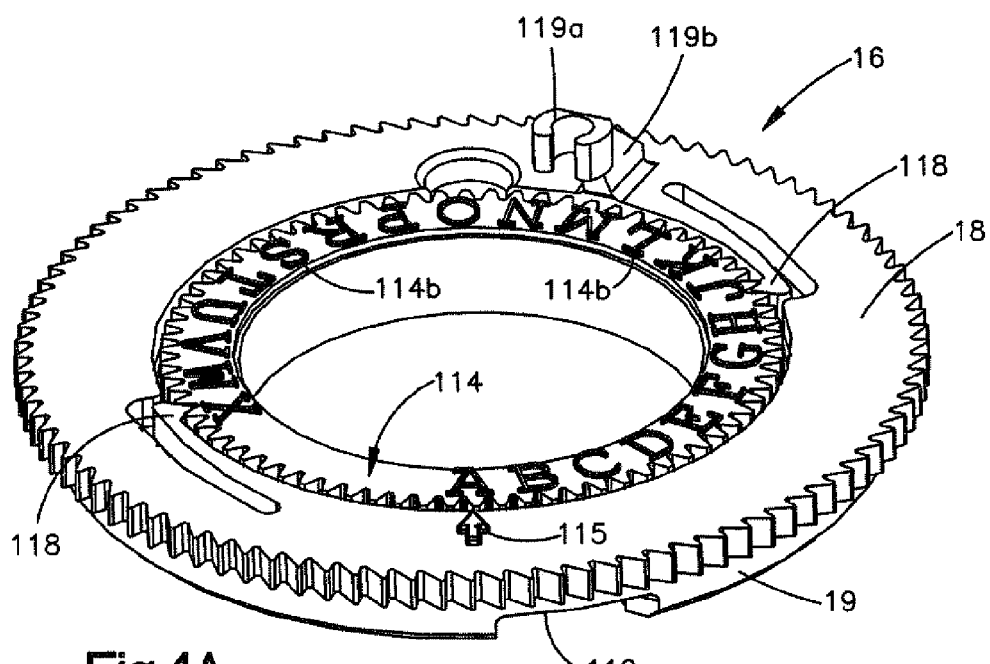
FIGS. 4A and 4B are two perspective views of the metering disc assembly, showing two positions of a regeneration initiation slot.
Figure 4B:
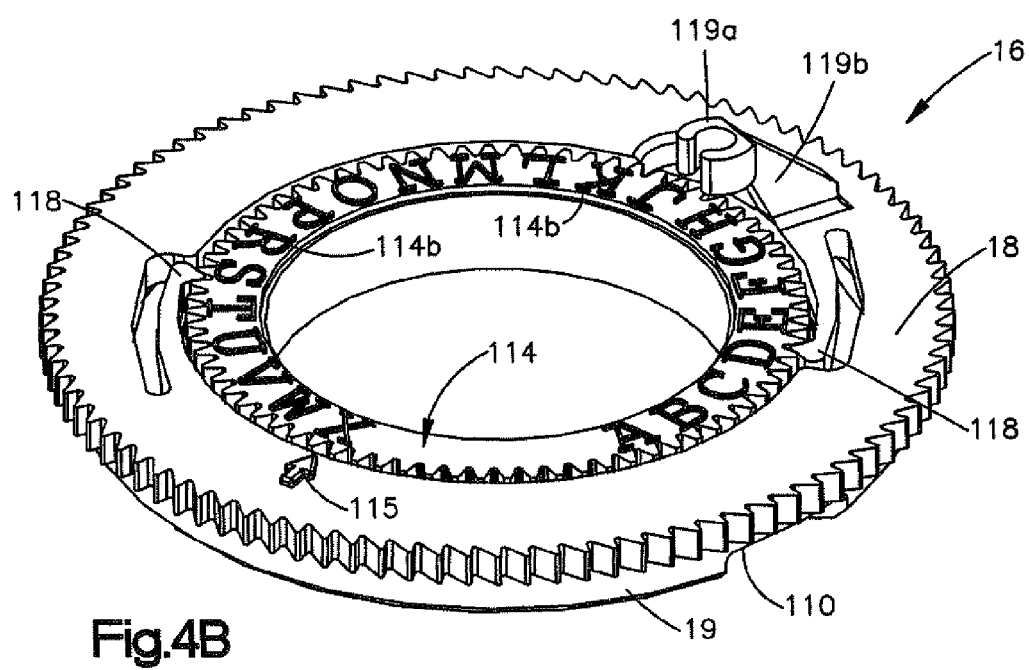

Referring to FIG. 3, the present invention replaces the single meter usage disc of the prior art with an adjustable water usage meter assembly 16 that comprises an upper meter disc 18 and a lower meter disc 19. The discs 18, 19 overlie each other and rotate on a common axis. As will be explained, these two discs 18, 19 are rotatably adjustable relative to each other. The lower discs 19 includes a cam slot opening 110 but, unlike the prior art, the position of the cam slot 110 is now adjustable relative to the upper disc 18 by virtue of the adjustable, relative rotative position between the top disc 18 and the bottom disc 19. The relative position of the cam slot 110 in the lower disc 19, with respect to the upper disc 18, determines the frequency of regeneration. FIG. 4A illustrates the relative position of the top and bottom disc 18, 19 which will produce the shortest regeneration frequency, whereas FIG. 4B illustrates the relative positions of the top and bottom discs 18, 19 that will produce the longest regeneration frequency.

Referring now to FIGS. 5 and 6, the relative position of the upper disc 18 with respect to the lower disc 19 is achieved using an adjustment knob 111 slidably and sealing carried by a valve cap 109a (shown best in FIG. 5). The removable cap 109a forms part of an overall valve housing 109. The adjustment knob 111 is pressed down (as viewed in FIG. 5) in order to depress an actuating member 112 so that a pinion gear 112a formed at the end of the actuating member 112 enters an opening 113 (shown best in FIG. 6) formed in the upper disc 18 and engages gear teeth 114a formed on an inner hub 114 of the lower meter disc 19. To effect this engagement, the opening 113 must be positioned directly below the actuating member 112. This is accomplished by placing the control valve into a regeneration cycle just prior to the adjustment, thereby causing the water usage meter assembly 16 to return to a "reset" or "start" position, as will be explained. When the water usage meter assembly 16 is in the reset position, the opening 113 is positioned below the actuating member 112. The engagement of the actuator pinion gear 112a and the subsequent rotation of the actuating member 112 in either direction moves the lower disc 19 in relation to the upper disc 18. The positioning between the upper and lower disc 18, 19 can be seen or is indicated by the indicia, preferably letters 114b, formed on the inner hub 114 of the lower disc 19 and an arrow 115 formed on the upper disc 18. The setting, as shown by the arrow 115 and its associated letter 114a can be seen through a viewing window 117, shown best in FIG. 7. Once adjusted, the discs 18, 19 are releasably held in position by two keeper pawls 118, shown best in FIG. 6. These pawls 118 provide enough resistance to keep the disc adjustment relatively locked in position, but are resilient enough to release the associated teeth 114a when sufficient force is applied by the actuating member 112. Once the adjustment is completed, the actuating member 112 is returned to its upper, spaced position by pulling on the associated knob 111 or allowing the water pressure in the cap area to naturally push the adjustment member to its upper position.

Figure 3A:
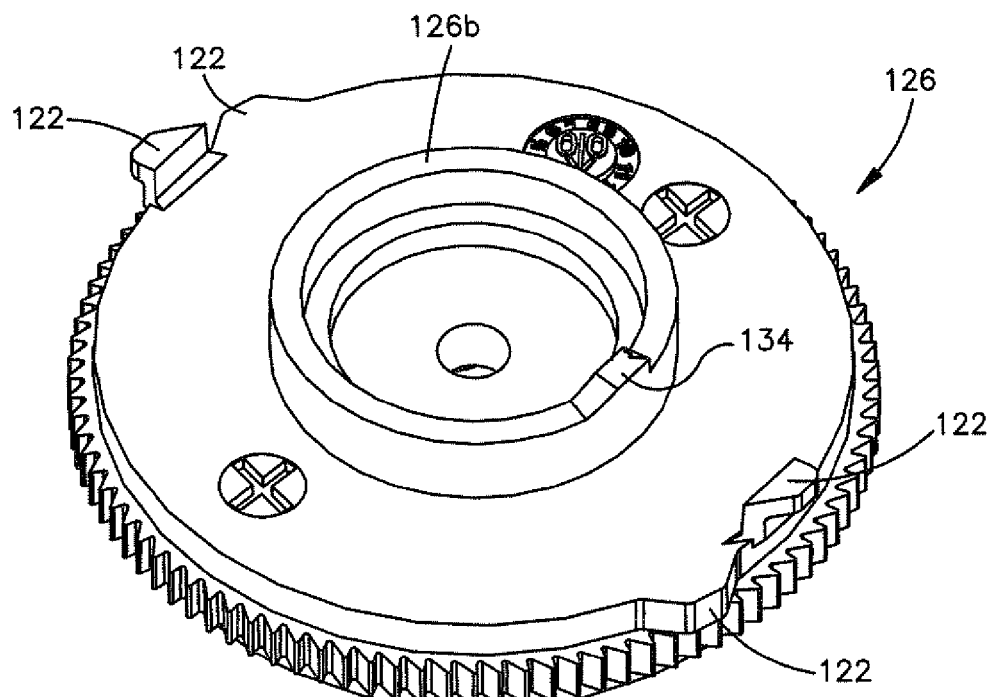
FIG. 3A is a perspective view of a regeneration control disc constructed in accordance with a preferred embodiment of the invention.

Unlike the prior art, the meter disc assembly 16 reverse rotates to a reset or start position during or after a regeneration. In the prior art construction, the meter disc continuously rotates in single direction. According to this feature of the invention and referring, in particular, to FIGS. 3, 4, and 6, the upper meter disc 18 includes a stop arm/spring mount 119. A stop pad 120, shown in FIG. 7B, extends downwardly from the top cap 109a. A return spring 121 is carried by a spool-like regeneration actuator 140 (see FIG. 5). The spring 121 which is preferably a torsion spring provides the energy or the force necessary to return rotate (reverse rotate) the disc assembly 16, in order to move the associated cam slot opening 110 to its starting position (which is determined by the relative position of the discs 18, 19). As seen best in FIGS. 4A, 4B and 5, the arm/spring mount 119 includes a stop 119b which cooperates with a stop pad 120 (FIG. 7B) that forms part of a control valve top cap 109a to establish the start position for the meter disc assembly 16. The arm/spring mount 119 also includes a spring mount 119a which is adapted to receive a leg 121a (shown best in FIG. 5) of the return spring 121. As the meter disc assembly 16 is advanced, the torsion spring 121 is tensioned and applies a return force to the meter disc assembly 16. As will be explained, a regeneration control disc 126 includes cams 122 (shown best in FIG. 3A) which operate to disengage pawls associated with the meter disc assembly 16 to allow the assembly to rotate freely to its return position. The torsion spring 121 provides the energy to return (rotate counterclockwise) the disc assembly 16 and, therefore, the cam slot opening 110 to its starting position. Referring to FIGS. 8C and 8D, the pawl disengagement cams 122 located on the circumference of the control disc 126, upon predetermined rotation of the control disc, concurrently disengage an anti-rotation pawl 124a and a meter disc advancing pawl 124b and thus allow the meter disc assembly 16 to rotate freely to its return position by virtue of the return spring 121.

Referring to FIGS. 5 and 6, the present invention operates as follows. A meter disc assembly drive pawl 123 including drive pawl 124b and associated eccentric shaft 124c reciprocally engages teeth 18a of the meter disc 18 and advances the water usage meter disc assembly 16 in the clockwise direction as water is being metered by a water usage turbine (similar to the turbine 1 shown in FIG. 2). Each single tooth advancement would be locked in by the action of the anti-rotation pawl 124a (shown best in FIG. 8C), which engages the teeth 18a and inhibits the backward rotation of the meter disc assemble 16 due to the drag of the meter pawl 124b that is created by its engagement or biasing spring 124d (FIG. 5). This clockwise advancement would continue until the cam slot opening 110 is rotated to position that allows the regeneration start pawl cam follower 125 to drop in (shown best if FIG. 8). This, in turn, allows the regeneration start pawl 129 to contact the teeth 126a of the control disc 126 so that further rotary motion of the eccentric shaft 124c not only moves the use meter disc assembly 16 but would also advances the control disc 126.

After a relatively small increment of rotation of the control disc 126, a signal port SP (see FIG. 2) is exposed to water pressure. As is conventional, this signal port SP feeds a pressure chamber of a control valve forming part of the control valve which causes the valve to open, thereby directing a stream of water at the regeneration drive turbine 8 by means of a nozzle 8c (FIG. 2). As is also conventional, the regeneration drive turbine through an associated gear train drives the regeneration control disc 126 through a separate regeneration drive pawl 127 and associated eccentric shaft assembly 127a. The regeneration drive pawl mechanism includes a drive pawl 127b and a biasing spring 128. The operation described above regarding the advancement of the regeneration control disc 126 by means of a regeneration control turbine is conventional and is substantially similar to the operation describe in U.S. Pat. No. 4,298,025, which is hereby incorporated by reference.

When the regeneration cycle is initiated, i.e., when the regeneration nozzle 8c (FIG. 2) emits a stream of water against the regeneration turbine, the regeneration control disc 126 is rotatably driven in the clockwise direction by the associated pawl mechanism 127 which is operatively connected to the regeneration control turbine 8. In the preferred embodiment, within a short increment of rotation, i.e., within four teeth of rotation, the pawl disengagement cams 122 that are mounted on the control disc 126 move into contact with the cam follower 129a located on the water usage meter pawl 129 (see FIGS. 8A-8D) and the extended tooth on the anti-rotation pawl 124a (shown best in FIGS. 5 and 8C). As the follower 129a and the tooth are pushed out by the rotation of the control disc 126 and its cams 122, the pawls 129, 124a, 124b are forced to disengage the water usage meter disc assembly 16. Upon disengagement, the water usage meter disc assembly 16 is free to be driven counterclockwise by the return spring 121 (see FIGS. 5 and 7B) until the upper disc top spring mount 119 contacts the stop pad 120 (see FIGS. 3, 6 and 7B). At this point, the water usage disc assembly is now reset and ready to begin its next cycle.

Depending on the specific application and the significance of the water volume used during the regeneration cycle, the pawl disengagement cams 122 (see FIGS. 3A and 8D) may be located circumferentially in various locations around the periphery of the control disc. Their location relative to the position on the regeneration control disc 126 that opens a conventional regeneration control valve (not shown) and begins the regeneration process will determine if the reset of the water usage e meter disc assembly 16 takes place at the beginning, in the middle, or at the end of a regeneration sequence.

Figure 7A:
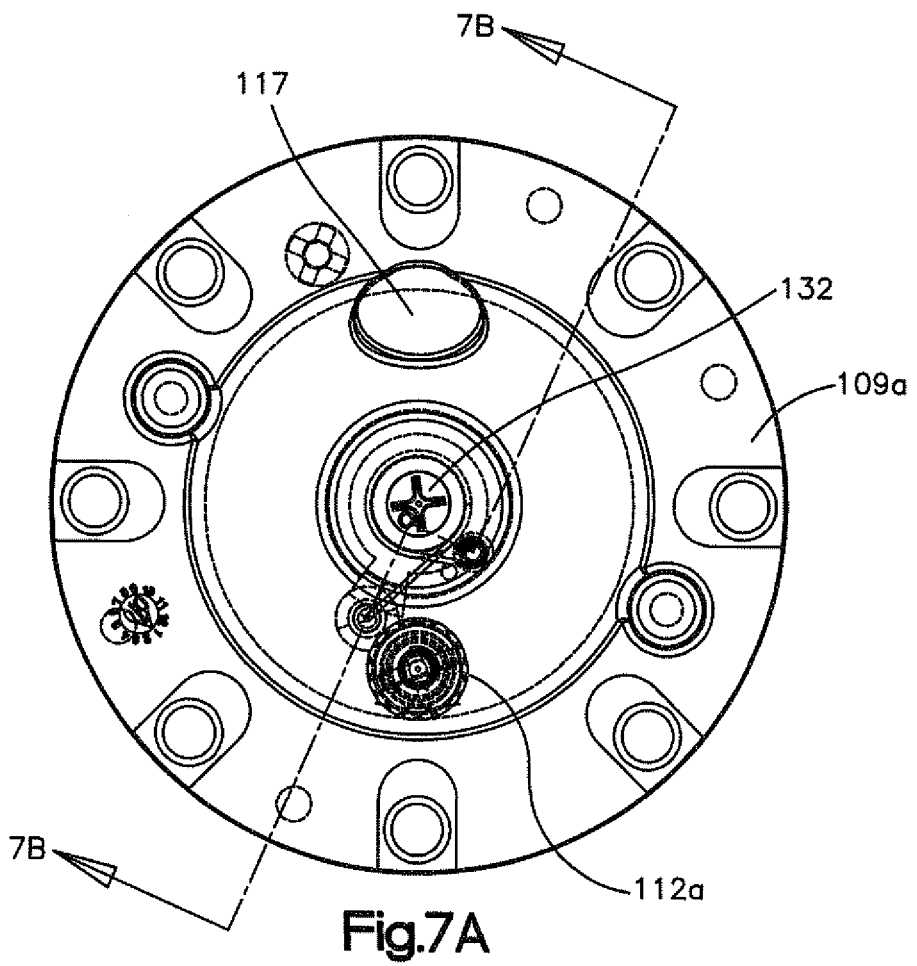
FIG. 7A is a top plan view of a valve housing cap and associated components forming part of the present invention.
Figure 7B:
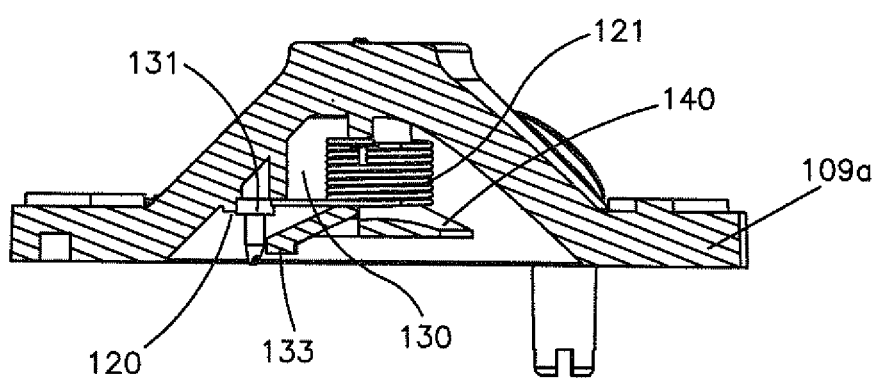
FIG. 7B is a sectional view of the cap and associated components as seen from the plane indicated by the line 7B-7B in FIG. 7A.
Figure 7C:
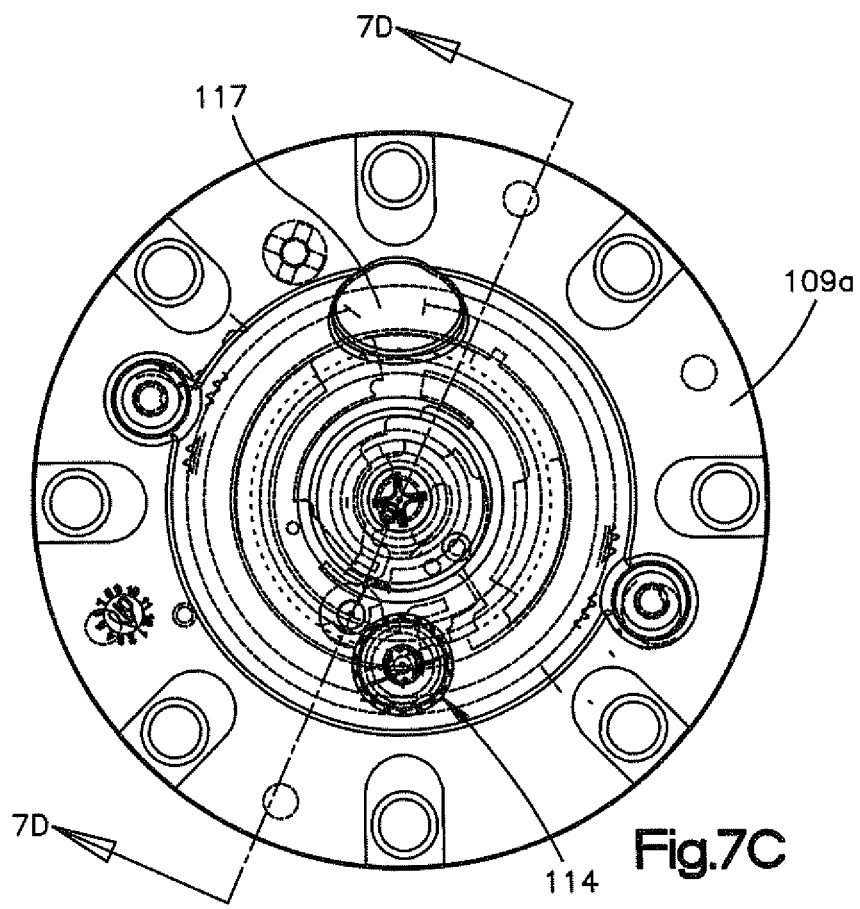
FIG. 7C is another top plan view of the view of the valve cap and associated components.
Figure 7D:
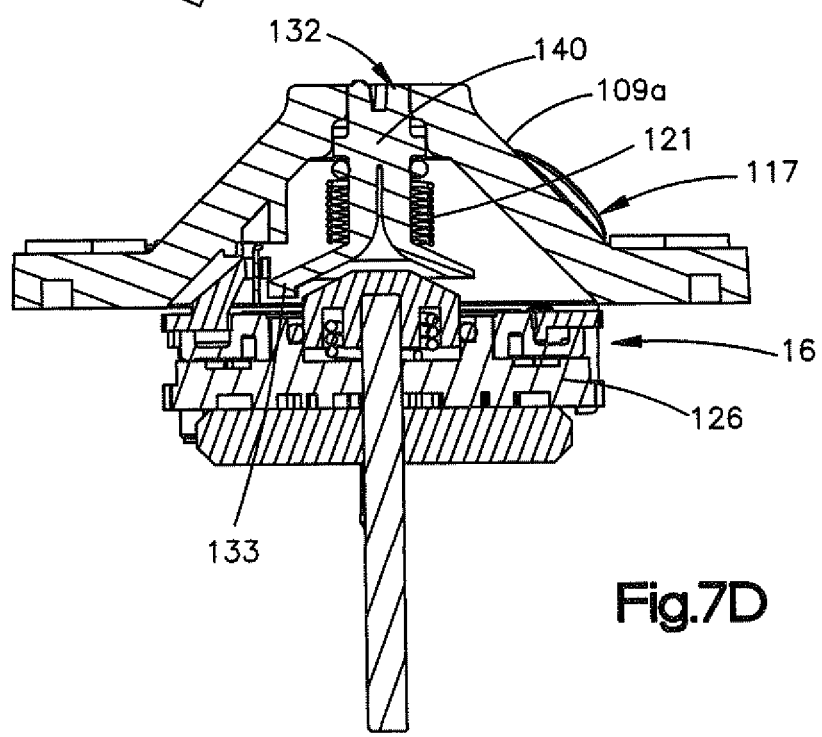
FIG. 7D is a sectional view of the cap and associated components as seen from the plane indicated by the line 7D-7D in FIG. 7C.

Referring to FIG. 7B, the return spring 121 that provides the energy required to perform the reset function is mounted in the cap assembly 109a and creates its torque by anchoring its one end on the cap spring mount post 130 and its free end which has a return spring tip 131 (shown best in FIGS. 5, 7B and 8A) mounted to the outward bent arm 121a of the spring 121 and gets pre-tensioned and placed behind the stop pad 120 (see FIG. 7B). As the cap is assembled onto the valve housing head 109 the spring arm receiving tip 131 (see FIGS. 5 and 8A) is fed into the upper disc stop/spring mount 119 (see FIGS. 3, 6 and 8) on the water usage meter disc assembly 16. This couples the meter disc assembly 16 to the return spring 121, thereby supplying a source of the return torque needed to reset the meter disc assembly 16 during or after each regeneration cycle (depending on the positions of the cams 122).

Figure 8A:
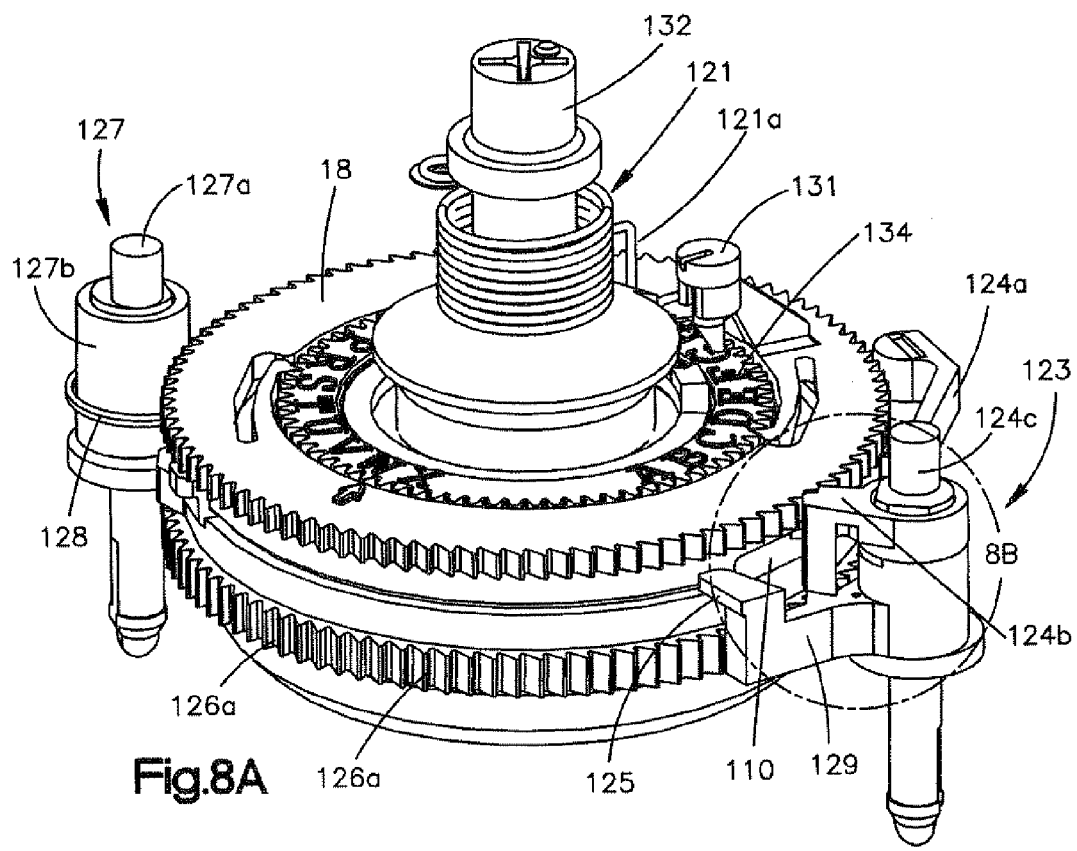
FIG. 8A is a perspective view of a water usage metering and regeneration control mechanism constructed in accordance with a preferred embodiment of the invention.
Figure 8B:
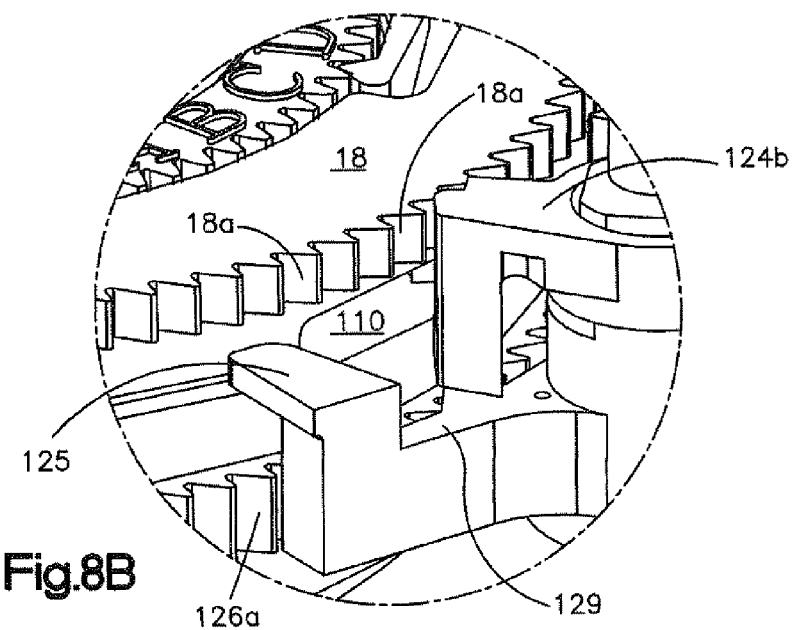
FIG. 8B is an enlarged view of a mechanism portion indicated by the circle 8B in FIG. 8A.
Figure 8C:
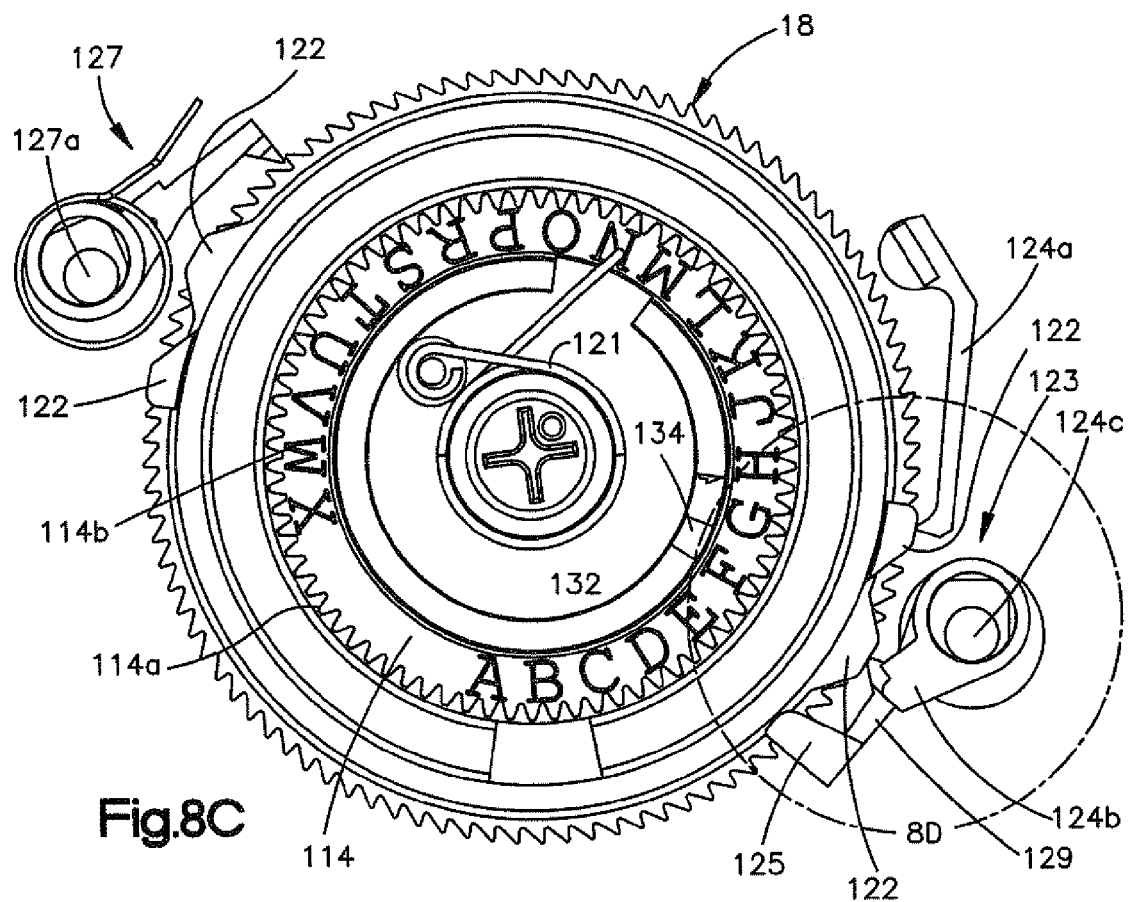
FIG. 8C is a top plan view of the mechanism shown in FIG. 8A.
Figure 8D:
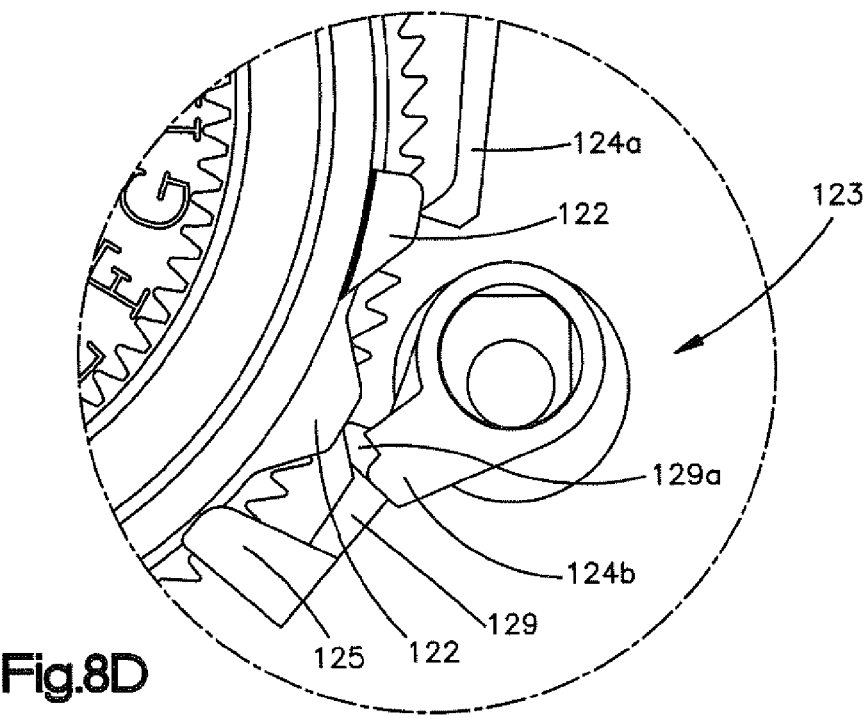
FIG. 8D is an enlarged view of a portion of the mechanism indicated by the circle 8D in FIG. 8C.

Important to the present invention is allowing for the newly created externally adjustable finer regeneration frequency selection as described previously while still including the external regeneration start feature described in U.S. Pat. No. 4,298,025. Referring to FIGS. 5 and 8A, the regeneration start feature incorporates an actuator member 140 including an externally accessible head 132 that sealingly penetrates the cap 109 and can be depressed using a standard Phillips screwdriver to thereby engage a dog or projection 134 (see FIGS. 3A, 5, 8A and 8C) that is part of a control disc center hub 126*b*. The downward movement of the actuator 140 using a suitable implement such as a Phillips screwdriver, engaging the actuator head 132 and the dog 134, and rotating the regeneration control disc 126 clockwise allows for the advancement of the control disc 126 which, in turn, can cause the system to enter various stages of a regeneration cycle depending on the degree of rotation of the control disc 126. This function is included in the present invention by extending the length of the actuator member 140 to provide room for the mounting of the return spring 121 in the cap area, and to design the return spring and meter disc assembly interface in such a way that the return spring 121 operates and engages the usage meter disc assembly 16 above the actuator 140 and its downwardly extending lug 133 (shown best in FIG. 7B).

Although the invention has been described with a certain degree of particularity, it should be understood that those skilled in the art can make various changes to it without departing from the spirit or scope of the invention, as hereinafter claimed.

The invention claimed is:

1. A control valve for controlling the regeneration of a water treatment system, comprising:
   a) a control valve housing containing a control valve;
   b) a water usage meter assembly comprising a first metering disc overlying a second metering disc, wherein the first meter disc includes teeth on an outer perimeter thereof and an opening on an inner perimeter thereof, and the second meter disc includes teeth facing the inner perimeter of the first meter disc and a regeneration initiation cam slot on an outer perimeter thereof;
   c) a regeneration control disc for controlling a sequence of steps during regeneration;
   d) said first and second meter discs being relatively rotatable with respect to each other in order to provide incremental adjustments to a position of the regeneration initiation cam slot;
   e) said water usage meter assembly being advanced by a water flow responsive pawl mechanism that engages teeth on the first meter disc until the regeneration initiation cam slot on the second meter disc is aligned with a regeneration initiation cam follower whereupon a regeneration pawl mechanism is activated in order to produce rotation in said regeneration control disc;
   f) said regeneration control disc including at least one cam that operates to release an anti-rotation pawl from the teeth on the first metering disc and allow said water usage meter assembly to reverse rotate to a reset position, under predetermined operating conditions;
   g) wherein relative rotation between said first and second meter discs is resisted by a keeper pawl on the first metering disc that engages the teeth on the second metering disc; and
   h) an external adjustment member including a stem mounted to the housing and having a portion extending outside of said control valve housing and a portion comprising a pinion gear located inside the housing, wherein the stem is axially movable relative to the housing so that the pinion gear can be engaged and disengaged with the opening in the second meter disc and the teeth on the second meter disc, whereby upon engagement of said pinion gear with the opening on the first disc and the teeth on said second meter disc, the second meter disc can be rotated relative to the first meter disc after the resistance to relative rotation between the meter discs imposed by the keeper pawl has been overcome, and upon disengagement of said pinion gear from the teeth on the second meter disc, said keeper pawl operates to maintain the relative positions of said meter discs, so that said first and second meter discs rotate as a unit.

2. The control valve of claim 1 wherein the anti-rotation pawl inhibits reverse rotation of said water usage meter assembly when said first anti-rotation pawl is in a first position, and wherein said regeneration control disc cam is operative to move said anti-rotation pawl to a second position at which it disengages said water usage meter assembly.

3. The control valve of claim 2 further including a spring that is tensioned as said water usage meter assembly is advanced by said pawl mechanism.

4. The control valve of claim 3 wherein said spring operates to reverse rotate said water usage meter assembly when said control disc cam moves said first pawl to its second position.

5. The control valve of claim 3 wherein said spring is a torsion spring.

6. The control valve of claim 1 wherein one of said predetermined operating conditions is the initiation of regeneration.

7. The control valve of claim 1 wherein one of said predetermined operating conditions is the completion of regeneration.

8. The control valve of claim 1 wherein said first and second meter discs and said regeneration control disc have a common rotational axis.

9. The control valve of claim 1 wherein said water responsive pawl mechanism Is operatively connected to a turbine that Is driven by water flowing in said control valve housing.

10. The control valve of claim 9 wherein said regenerating pawl mechanism is operatively connected to a regeneration control turbine located in said valve housing.

11. The control valve of claim 1 wherein the relative positions of said first and second meter discs determines the frequency of regeneration.

12. The control valve of claim 1 further comprising at least two keeper pawls.

\* \* \* \* \*